Patented July 30, 1940

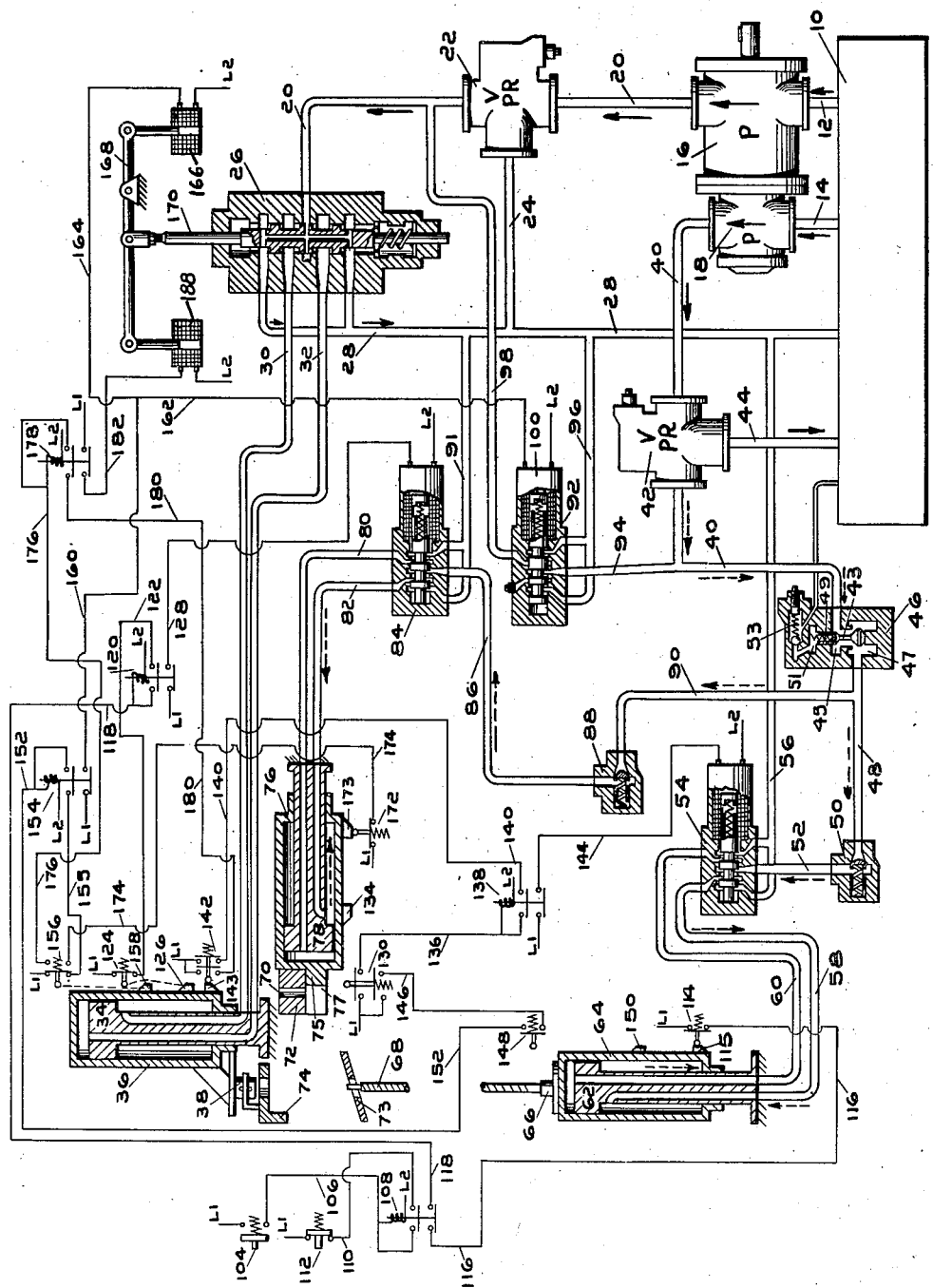

2,209,608

UNITED STATES PATENT OFFICE 2,209,608

POWER TRANSMISSION

Hugh C. Nye and Merrill A. Hayden, Detroit, Mich., assignors to Vickers Incorporated, Detroit, Mich., a corporation of Michigan Application February 23, 1938, Serial No. 192,030

5 Claims. (Cl. 60—52)

This invention relates to power transmissions and more particularly to those of the fluid type wherein a power transmitting fluid, such as oil, and hereinafter referred to as such, is utilized for the transmission of power between one or more pumps and one or more fluid motors.

The invention is particularly concerned with a power transmission system adapted for operating a plurality of hydraulic motors in predetermined sequence and may be used, for example, for a hydraulically operated broaching machine.

In the art of broaching machines it is common to provide a maintool operating slide for pulling a broaching tool through a hole in a piece of work and to provide an auxiliary slide for handling the broaching tool at its opposite end while the tool is disconnected from the main slide for the purpose of inserting a new work piece in position. Broaching machines of this character are also frequently provided with a work shifting and clamping slide reciprocable transversely of the tool to position a new work piece for broaching as well as to hold the work piece while the broaching operation is performed.

It is an object of the present invention to provide a hydraulic power transmission system particularly adapted for the automatic operation of a broaching machine of this character and which, when started, will operate automatically to cause the slides to move in proper sequence through repeated cycles continuously until stopped at will.

Further objects and advantages of the present invention will be apparent from the following description, reference being had to the accompanying drawing wherein a preferred form of the present invention is clearly shown.

In the drawing:

The single figure is a diagrammatic view showing a hydraulic circuit embodying a preferred form of the present invention.

A tank 10 contains a supply of oil which may be withdrawn through suction conduits 12 and 14, by a pair of pumps 16 and 18, adapted for operation by a common prime mover, not shown. Pump 16 has a delivery conduit 20 in which is inserted a suitable relief valve 22 for discharging oil to the tank through a by-pass conduit 24 whenever a predetermined pressure is exceeded in conduit 20.

Conduit 20 leads to the pressure port of a spring centered, open center, four-way valve 26. Valve 26 has its tank ports connected to the tank by a conduit 28. Conduits 30 and 32 lead from the cylinder ports to the rod and head sides, respectively, of a fixed piston 34 on which is reciprocably mounted a movable cylinder 36. The latter forms the main slide of the broaching machine and may be provided with suitable tool attaching means 38, adapted to automatically grasp the end of a tool when the latter is inserted therein and to automatically release the same when the cylinder 36 is down.

The pump 18 has a discharge conduit 40 in which is inserted a relief valve 42 for by-passing oil to the tank through a conduit 44 whenever a predetermined pressure is exceeded in conduit 40. Inserted in the conduit 40 is a pressure reducing valve 46 for the purpose of preventing the pressure in a conduit 48, from rising above a predetermined value. The valve 46 may comprise a movable member 43 which controls the flow from a chamber 45 to a chamber 47. The member 43 is balanced with respect to the pressure in chamber 45 but is exposed to pressure in chamber 47 pushing upwardly against a spring 49 and against the oil in a chamber 51 which is maintained therein by seepage past the piston portion of member 43. A pilot relief valve 53 may be adjusted to determine the maximum pressure in chamber 51 and thus the pressure in chamber 47 at which the valve will start to close. At any pressure below this value the valve remains open.

A check valve 50 is open to free flow of oil from the conduit 48 to a conduit 52 which leads to the pressure port of a spring biased solenoid operated four-way valve 54. A conduit 56 connects the tank ports of valve 54 to the tank 10. The cylinder ports of the valve are connected by conduits 58 and 60 with the rod and head sides, respectively, of a stationary piston 62. A cylinder 64 is reciprocably mounted on the piston 62 and forms a tool handling slide having a tool receiving socket 66.

A broaching tool is indicated at 68, adapted to be lifted by the cylinder 64 to be inserted through a hole 70 in a work piece 72 when it is positioned against an abutment 74. The tool 68, when lifted far enough to engage the tool holding means 38, is automatically locked thereto and may be pulled through the hole 70 by the cylinder 36 in the well known manner. As the lower end of the tool 68 leaves the hole 70, the work piece 72 may be permitted to drop away from the abutment 74, a stationary deflector 73 being provided to deflect the work piece to one side, and the broaching tool may be returned to engage the socket 66 which then lowers the tool downwardly to the position shown here. A new work piece then may be positioned beneath the abutment 74.

For the purpose of feeding new work pieces into position and for clamping them during broaching, a work handling slide is formed by a cylinder 76. The latter is provided with a work piece holder 75 in the form of an angle block having a central slot indicated at 77 for straddling the broaching tool 68. The holder 75 is adapted to receive a work piece by gravity from a suitable hopper above the same whenever the cylinder 76 is retracted to the right, as shown, and to move the piece into position under the abutment 74 and clamp the same there when the cylinder 76 is moved to the left. The cylinder 76 is reciprocably mounted on a fixed piston 78, the head and rod ends of which are connected by conduits 80 and 82 to the cylinder ports of a spring biased, solenoid operated, four-way valve 84. The pressure port of valve 84 communicates by a conduit 86 with a check valve 88. A conduit 90 extends from the conduit 48 to the check valve 88 which is open to free flow from the conduit 90 to the conduit 86. The tank ports of valve 84 are connected to tank by a conduit 91. It will be understood that the cylinder 76 is normally positioned to reciprocate transversely in a plane at right angles to plane of the drawing, the arrangement shown being used for clarity of illustration.

For the purpose of, at times, utilizing the output of both pumps 16 and 18, for operating the main cylinder 36, a solenoid operated spring biased, two-way valve 92 is provided, having its pressure port connected to the conduit 46 by the branch conduit 94. The controlled port of valve 92 connects by a conduit 98 with the pressure conduit 20. Suitable drain connection to the valve 92 is established by a conduit 96. Valve 92 may be shifted to the right to open the valve by an operating solenoid 100 and is normally spring biased to closed position.

For the purpose of controlling the four-way valves in proper sequence, a control circuit is provided as follows: From one side of a suitable electric power line L1, a normally open push button starting switch 104 connects by a conductor 106 to the operating coil of a holding relay 108 and the other side of the line L2. The holding circuit 110 of the relay connects to a normally closed push button stopping switch 112 to the line L1. The relay 108 controls a circuit extending from L1 through a normally open limit switch 114, which is adapted to be closed by a cam 115 on the cylinder 64 when the latter is in its downward position. From the limit switch 114, a conductor 116 extends to the controlled contacts of the relay 108, from which a conductor 118 extends to the operating coil of a holding relay 120 and line L2. The holding circuit of the relay 120 extends by a conductor 122 through a normally closed limit switch 124 to the line L1. The switch 124 is adapted to be actuated by a cam 126, carried by the cylinder 36 and positioned to open the switch 124, a short distance before the cylinder reaches the upper limit of its stroke. The relay 120 controls a circuit extending from L1 by a conductor 128 through the solenoid of the valve 84 to the line L2.

A normally open, two-circuit limit switch 130 is adapted to be actuated by a cam 134 on cylinder 76 whenever the latter reaches the leftward limit of its stroke. The limit switch 130 controls a circuit including a conductor 136 which extends to the operating coil of a holding relay 138. The holding circuit of the latter extends by a conductor 140 through a normally closed two-circuit limit switch 142 and to the line L1. The limit switch 142 is operated by a cam 143 whenever cylinder 36 is in its lower position. The relay 138 controls a circuit extending from the line L1 by a conductor 144 through the operating solenoid of the valve 54 to line L2. The limit switch 130 also controls a circuit extending by a conductor 146 to a normally open limit switch 148, operated by a cam 150 on the cylinder 64 whenever the latter reaches the upper limit of its movement. A conductor 152 extends from the switch 148 to the operating coil of holding relay 154. The holding circuit of the latter extends by a conductor 155 to line L1 through a double throw limit switch 156 adapted to be actuated by a cam 158 carried by the cylinder 36 when the latter reaches the upper limit of its movement. The relay 154 controls a circuit extending from L1 by a conductor 160 and branch conductors 162 and 164 to the solenoid 100 and to a solenoid 166 connected by a lever 168 to the operating stem 170 of the valve 26. The limit switch 156 and a normally open limit switch 172 operated by a cam 173 when cylinder 76 is in its right hand position, are in a series circuit extending from L1 by conductors 174 and 176 to the operating coil of a holding relay 178 and line L2. The holding circuit of the latter relay extends by a conductor 180 to the other contacts of limit switch 142, previously described, and to line L1. The relay 178 controls a circuit extending from L1 by a conductor 182 to the solenoid 188 connected to the opposite end of the lever 168.

In operation, starting with the parts in position, shown in the drawing, and the pumps 16 and 18 operating, fluid delivered by the pump 16 is by-passed from the pressure port to the tank ports of the open center valve 26, thus unloading the pump 16, as shown by the solid line arrows. Delivery from the pump 18 is blocked by the stalling of cylinders 64 and 76, at the bottom and right hand limits, respectively, of their travel and accordingly pressure builds up, as shown by the dotted arrows, sufficiently to open the relief valve 42 by-passing oil to the tank through conduit 44, as shown by the solid line arrows.

To start the machine the starting switch 104 is closed manually which energizes the relay 108 through conductor 106. This closes the circuit extending from L1 through switch 114, conductor 116, relay 108, conductor 118 and coil of relay 120 to line L2. The relay 120 closes a circuit extending from line L1 through conductor 128 and the solenoid of valve 84 to line L2. The valve 84 is accordingly shifted to the right to connect the pressure port with conduit 80 and the tank ports with conduit 82. The cylinder 76, accordingly, moves to the left to position a fresh work piece beneath the abutment 74. The oil is delivered for this movement from pump 18, through conduit 40, valve 46, conduit 90, check valve 88, conduit 86, valve 84 and conduit 80 to the head end of cylinder 76. Oil from the rod end passes through conduit 82, valve 84 and conduits 91 and 28 to the tank. The relays 108 and 120 are, of course, held closed by their respective holding circuits after they are once energized momentarily.

As the cylinder 76 reaches the left end of its travel, cam 134 closes limit switch 130, which energizes the coil of relay 138 through conductor 136. The relay 138 establishes a circuit through a conductor 144 to the solenoid of valve 54, shifting the latter to the right to connect the pressure port with conduit 60 and the tank ports with conduit 58. The cylinder 64, accordingly, moves upwardly, oil being delivered from the pump 18 through the conduit 40, valve 46, conduit 48, check valve 50, conduit 52, valve 54 and conduit 60 to the head end of cylinder 64. Fluid returning from the rod end passes through conduit 58, valve 54 and conduit 56 to the tank. It will be noted that the oil delivered to the cylinder 64 as well as that delivered to cylinder 76 passes through reducing valve 46. The valve is adjusted so that the normal pressure required for moving these cylinders does not cause the valve to close. When, however, the valve 92 is moved to connect conduits 94 and 96, valve 46 prevents the much higher pressure, which is built up in conduits 20 and 40 for operating cylinder 36, from being transmitted to the head ends of cylinders 64 and 76. These latter cylinders may thus be of lighter construction than would otherwise be necessary.

As the cylinder 64 reaches the upper limit of its travel, limit switch 148 is closed, establishing the circuit from L1 through the limit switch 130 (now closed), conductor 146, switch 148, conductor 152 and the coil of relay 154 to line L2. Closing of the relay 154 establishes a circuit through conductors 160, 162 and 164 to the solenoids 100 and 166. The valve 92 is accordingly shifted to the right to connect conduits 94 and 98 thus permitting the delivery of pump 18 to flow through conduit 40, and conduits 94 and 98 to join the delivery of pump 16 in the conduit 20.

The energization of solenoid 166 lifts the stem 170 of valve 26 to connect the conduit 20 with the conduit 32, permitting oil delivered by both pumps to flow from conduit 20 to the conduit 32, to the head end of cylinder 36. Oil returning from the rod end flows through conduit 30, valve 26 and conduit 28 to the tank.

The cylinder 36, accordingly, moves upwardly. Some distance before it reaches the upper limit of its travel cam 126 opens limit switch 124 and thus breaks the holding circuit of the relay 120, the initiating circuit for this relay being opened at the limit switch 114, which opened as the cylinder 64 started upwardly. The opening of relay 120 deenergizes the solenoid of valve 84, permitting the latter to move to the left under its spring bias thus reversing connections to cylinder 76 and causing the latter to return to the right, unclamping the work piece 72, which is clamped beneath the abutment 74, and retracting the holder 75 from beneath the work piece. During this interval, it will be noted that both cylinders 76 and 36 are jointly connected to both pumps 16 and 18. The pressure on cylinder 76 is limited, however, by valve 46.

As the cylinder 76 starts to the right, cam 134 releases limit switch 130, opening the initiating circuit for relay 138 and for relay 154. As cylinder 76 completes its rightward movement, cam 173 closes relay 172 and closes one break in the initiating circuit for relay 178. When cylinder 36 completes its upward movement, the tool 68 is pulled clear through the work piece 72, which drops by gravity and is pushed to one side by the deflector 73. At the same time cam 158 engages limit switch 156 thus opening the holding circuit for relay 154 and completing the initiating circuit for relay 178, from L1 through limit switch 172, conductor 174, limit switch 156, conductor 176 and coil of relay 178 to line L2. The relay 154 first opens deenergizing the solenoids 166 and 100, permitting valve 26 to spring center, thus by-passing the delivery of pump 16 and stopping movement of cylinder 36, and permitting valve 92 to move to the left under its spring bias, thus breaking the circuit connecting pumps 16 and 18. The relay 178 closes the circuit through conductor 182 to the solenoid 188. The stem 170 of valve 26 is, accordingly, moved downwardly. The shifting of valve 26 downwardly connects the rod end of cylinder 36 to the delivery side of pump 16, through conduits 20 and 30, thus causing the cylinder to descend.

As the cylinder 36 reaches the bottom of the stroke, cam 143 opens the limit switch 142, breaking the holding circuit 140 for relay 138 and also the holding circuit 180 for relay 178. The initiating circuit for relay 138 is open at limit switch 130 while the initiating circuit for relay 178 is open at limit switch 156. Opening of the relay 138 deenergizes the solenoid of valve 54, reversing the connections to cylinder 64 and causing the latter to descend to starting position. As the cylinder 64 reaches bottom, cam 115 again closes limit switch 114 initiating a cycle of operations identical to that described. The system repeats these cycles so long as the holding circuit 110 of relay 108 is not opened at the stop switch 112. When this switch is depressed, relay 108 opens the initiating circuits 116—118 for relay 120. Thus, no matter at what phase of the cycle the button 112 is depressed, the machine will continue to operate until the end of that cycle and then stop due to inability of the limit switch 114 to energize the relay 120.

While the form of embodiment of the invention as herein disclosed, constitutes a preferred form, it is to be understood that other forms might be adopted, all coming within the scope of the claims which follow.

What is claimed is as follows:

1. In a hydraulic power transmission system the combination of means forming a source of fluid under pressure, a main motor operable by fluid delivered from said source, a first and second auxiliary motor also operable by fluid delivered from said source, valve means for controlling the supply of fluid to the motors, a control circuit for operating the valve means and means in the circuit operated by movement of the motors for causing operation of the motors in a predetermined sequence of forward movements of the motors and a different sequence of reverse movements thereof, starting means in the circuit effective when operated to cause repeated cycles of operation of the motors in sequence under the control of the motor operated means, and stopping means in the circuit effective when operated to condition the circuit for stoppage of the motors when they reach a predetermined position in the cycle of sequential movements.

2. In a hydraulic power transmission system the combination of a plurality of pump means forming a source of fluid under pressure, a main motor operable by fluid delivered from said source, an auxiliary motor also operable by fluid delivered from said source, valve means for controlling the supply of fluid to the motors, a control circuit for operating the valve means and means in the circuit operated by movement of the motors for causing operation of the motors in a predetermined sequence of forward and reverse movements, means connecting the main motor to one pump, means connecting the auxiliary motor to another pump and a valve for connecting the main motor to both pumps during movement in one direction.

3. In a hydraulic power transmission system the combination of a plurality of pump means forming a source of fluid under pressure, a main motor operable by fluid delivered from said source, an auxiliary motor also operable by fluid delivered from said source, valve means for controlling the supply of fluid to the motors, a control circuit for operating the valve means and means in the circuit operated by movement of the motors for causing operation of the motors in a predetermined sequence of forward and reverse movements, means connecting the main motor to one pump, means connecting the auxiliary motor to another pump and a valve for connecting the main motor to both pumps during movement in one direction, said control circuit having connections for operating the last said valve.

4. In a hydraulic power transmission system for operating a machine tool having a main slide for operating on a piece of work and an auxiliary slide for moving and holding a work piece into position for such operation, the combination of a main motor connected to operate the main slide, an auxiliary motor connected to operate the auxiliary slide, individual pumps for operating the motors, a circuit, including valve means for controlling the motors individually, connecting the pumps with their respective motors, means forming a selectively operable connection from both pumps to the main motor, motor operated means for controlling said valves to energize the auxiliary motor forwardly and then the main motor forwardly, and means for imparting a reverse movement to the auxiliary motor to release the work piece before completion of the forward movement of the main motor.

5. In a hydraulic power transmission system for operating a machine tool having a main slide for operating on a piece of work and an auxiliary slide for moving and holding a work piece into position for such operation, the combination of a main motor connected to operate the main slide, an auxiliary motor connected to operate the auxiliary slide, individual pumps for operating the motors, a circuit, including valve means for controlling the motors individually, connecting the pumps with their respective motors, means forming a selectively operable connection from both pumps to the main motor, motor operated means for controlling said valves to energize the auxiliary motor forwardly and then the main motor forwardly, and means for connecting the auxiliary motor to both pumps for reverse operation to release the work piece before completion of the forward stroke of the main motor.

HUGH C. NYE.
MERRILL A. HAYDEN.